US009825977B2

(12) United States Patent
Demov et al.

(10) Patent No.: US 9,825,977 B2
(45) Date of Patent: *Nov. 21, 2017

(54) SYSTEM AND METHOD FOR CONTROLLING ACCESS TO DATA OF A USER DEVICE USING A SECURITY APPLICATION THAT PROVIDES ACCESSIBILITY SERVICES

(71) Applicant: AO Kaspersky Lab, Moscow (RU)

(72) Inventors: Alexey A. Demov, Moscow (RU); Konstantin M. Filatov, Moscow (RU); Victor V. Yablokov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,353

(22) Filed: Nov. 23, 2016

(65) Prior Publication Data

US 2017/0180400 A1    Jun. 22, 2017

Related U.S. Application Data

(63) Continuation of application No. 15/062,960, filed on Mar. 7, 2016, now Pat. No. 9,536,101.

(30) Foreign Application Priority Data

Dec. 18, 2015  (RU) .................................. 2015154384

(51) Int. Cl.
*H04L 29/06* (2006.01)
*H04W 12/08* (2009.01)
(52) U.S. Cl.
CPC ...... *H04L 63/1416* (2013.01); *H04L 63/0245* (2013.01); *H04L 63/1483* (2013.01); *H04W 12/08* (2013.01)

(58) Field of Classification Search
CPC . H04L 63/20; H04L 63/1416; H04L 63/0245; H04L 63/1483; H04W 12/06;
(Continued)

(56) References Cited

U.S. PATENT DOCUMENTS 7,694,128 B2 *  4/2010  Judge ..................... H04L 51/12
                                                  380/282
7,865,931 B1    1/2011  Stone
(Continued)

OTHER PUBLICATIONS

Yeongjin Jang et al., "A11y Attacks" Computer Communication Security, Nov. 3. 2014 pp. 103-115.

*Primary Examiner* — Hosuk Song
(74) *Attorney, Agent, or Firm* — Arent Fox LLP; Michael Fainberg (57) ABSTRACT

Disclosed are systems and methods for controlling access to data of a user device using a security application that provides accessibility services. An exemplary method comprises: executing, on the user device, the security application and one or more user applications; intercepting, by an interception module of the security application using a plurality of accessibility API functions, data accessed by a user application being executed on the user device; determining, by a categorization module of the security application, a category of intercepted data; intercepting, by the interception module using the accessibility API functions, one or more events of user's interaction with a user interface of the user application; and determining, by an access control module of the security application, an access control policy that specifies and controls whether to allow a user's access to the intercepted data based on the category of intercepted data and types of intercepted events.

20 Claims, 3 Drawing Sheets

(58) Field of Classification Search
CPC ...... H04W 12/081; G06F 21/10; G06F 21/31; G06F 21/45
USPC .............................................. 726/1–3, 27–30
See application file for complete search history.

(56) References Cited

U.S. PATENT DOCUMENTS

| | | | |
|---|---|---|---|
| 7,984,514 B1* | 7/2011 | Meketa | G06F 21/52 |
| | | | 713/1 |
| 8,023,974 B1 | 9/2011 | Diao et al. | |
| 8,099,789 B2* | 1/2012 | Challener | H04L 9/3236 |
| | | | 726/27 |
| 8,826,419 B2* | 9/2014 | Austin | G06F 21/6218 |
| | | | 726/20 |
| 8,955,050 B1* | 2/2015 | Shigapov | H04L 63/08 |
| | | | 718/100 |
| 9,100,440 B1 | 8/2015 | Manmohan | |
| 9,154,912 B2 | 10/2015 | Zubas et al. | |
| 9,536,101 B1* | 1/2017 | Demov | G06F 21/62 |
| 2002/0065776 A1 | 5/2002 | Calder | |
| 2003/0131152 A1 | 7/2003 | Erlingsson | |
| 2004/0199763 A1 | 10/2004 | Fruend | |
| 2006/0036570 A1 | 2/2006 | Schaefer et al. | |
| 2006/0143464 A1 | 6/2006 | Ananthanarayanan | |
| 2007/0113291 A1 | 5/2007 | Dai et al. | |
| 2007/0124817 A1 | 5/2007 | Larsen | |
| 2007/0157077 A1 | 7/2007 | Gibson | |
| 2007/0219941 A1 | 9/2007 | Schnurr | |
| 2007/0239456 A1 | 10/2007 | Goodman | |
| 2007/0250927 A1 | 10/2007 | Naik | |
| 2008/0084799 A1 | 4/2008 | Repasi | |
| 2008/0303645 A1 | 12/2008 | Seymour | |
| 2011/0119289 A1 | 5/2011 | Fields et al. | |
| 2011/0283243 A1 | 11/2011 | Eckhardt et al. | |
| 2014/0058733 A1 | 2/2014 | Voorhees et al. | |
| 2014/0195604 A1 | 7/2014 | Wyatt et al. | |
| 2015/0271207 A1 | 9/2015 | Jaiswel et al. | |
| 2015/0317404 A1 | 11/2015 | Hibbs | |

* cited by examiner

SYSTEM AND METHOD FOR CONTROLLING ACCESS TO DATA OF A USER DEVICE USING A SECURITY APPLICATION THAT PROVIDES ACCESSIBILITY SERVICES

CROSS-REFERENCE TO RELATED APPLICATIONS

The present application is a continuation of U.S. patent application Ser. No. 15/062,960 filed Mar. 7, 2016 and titled SYSTEM AND METHOD FOR CONTROLLING ACCESS TO DATA USING API FOR USERS WITH DISABILITIES and claims benefit of priority under 35 U.S.C. 119(a)-(d) to a Russian Patent Application No. 2015154384 filed on Dec. 18, 2015, both of which are incorporated by reference herein.

FIELD OF TECHNOLOGY

The present invention relates generally to the field of computer security and, and more specifically, to systems and methods for controlling access to data of a user device using a security application that provides accessibility services.

BACKGROUND

In the Android operating system (OS) and in a number of other mobile operating systems (e.g., iOS, Windows Phone) in order to ensure safety during the execution of user applications by the OS, an isolated program execution environment known as a "sandbox" may be used. The isolated environment usually constitutes a controllable set of resources available to the application for its execution, such as space on the disk or in the memory, the number of processor cores which can be used, and so on. Moreover, usually either the execution of functions is partly emulated, or access to the network (local area or Internet) and the ability to use the OS functions or to read information from a data input device is greatly restricted. Applications executed in such an isolated environment are not able to read much less write into random access memory areas, which are accessible or dedicated to other applications.

In order to call system functions, a user application must request additional permissions. Most often such permissions are granted by the user either during the installation of the application (in earlier versions of the Android OS), or during the launching or execution of an application (in later versions of the Android OS and in other OS). Examples of such permissions include, permission to work with SMS/MMS messages, permission to access user contacts, and permission to access network services. The number of actions which a user application can execute outside of the isolated environment with the help of permissions is likewise limited. The permissions themselves are usually of various kinds: those which can be granted to all user applications, and those which are granted only to a limited group of user applications, such as only those constituting firmware of the user device. An example of a permission granted to a limited group of user applications is a permission to restart a user device.

A security application is also considered to be an external application and thus restricted in its rights in the framework of its isolated environment and those additional permissions granted to it by the user. Therefore, difficulties arise with a security application obtaining data available to other external applications. There are no permissions for reading the data of other applications in the list of permissions provided to external applications by the operating system, since such permissions are contrary to the approach of using an isolated environment. Therefore, there is a need to improve a mechanism for a security application to control access to data by external user applications executing in an isolated environment on a mobile device.

SUMMARY

Modern mobile operating systems often have subsystems that facilitate the work with the device for users with disabilities. In some cases, these subsystems have application programming interfaces (APIs) that allow third-party developers to create applications that provide people with disabilities alternative ways of interacting with the device (e.g., via text narration, output of data to an external device that supports the display of Braille, etc.). The disclosed systems and method provide a mechanism of controlling access to data of user applications executing in an isolated environment on a user device using an application programming interface (API) for users with disabilities ("accessibility API").

Disclosed are systems and methods for controlling access to data of a user device using a security application that provides accessibility services. An exemplary method comprises: executing, on the user device, the security application and one or more user applications; intercepting, by an interception module of the security application using a plurality of accessibility API functions, data accessed by a user application being executed on the user device; determining, by a categorization module of the security application, a category of intercepted data; intercepting, by the interception module using the accessibility API functions, one or more events of user's interaction with a user interface of the user application; and determining, by an access control module of the security application, an access control policy that specifies and controls whether to allow a user's access to the intercepted data based on the category of intercepted data and types of intercepted events.

In one exemplary aspect, the method further comprises: obtaining information relating to at least: user applications to be monitored by the security application, types of events during an execution of the user applications to be monitored by the security application, and access rights of the user applications.

In one exemplary aspect, executing the security application and the one or more user applications comprises: executing the security application and the one or more user applications in an isolated environment that is created by an operating system of the user device at the time of launching each of the one or more user applications.

In one exemplary aspect, the plurality of accessibility API functions comprise at least one of: a voice narration function, a screen magnifier function, a data output function to an external device supporting a Braille display.

In one exemplary aspect, the method further comprises: determining, by the categorization module of the security application, the category of intercepted data comprises performing at least one of an anti-virus or anti-phishing analysis of the intercepted data, wherein the anti-virus analysis includes at least one of a signature analysis, a heuristic analysis, or a behavior analysis of the intercepted data for presence of malware, and the anti-phishing analysis includes an analysis of active control elements of the user interface of the user application.

In one exemplary aspect, the method further comprises: blocking, by the access control module of the security application, the user's access to at least a portion of the intercepted data in response to detecting that the category of intercepted data indicates a harmful category and the types of intercepted events indicate a presence of undesirable information.

In one exemplary aspect, the method further comprises: maintaining a log of data entered and displayed by the user application on the user interface of the user device for parental control purposes.

An exemplary system for controlling access to data of a user device using a security application installed as an accessibility service on the user device comprises: a hardware processor of the user device configured to: execute the security application and one or more user applications; intercept, via an interception module of the security application using a plurality of accessibility application program interface (API) functions, data accessed by a user application being executed on the user device; determine, via a categorization module of the security application, a category of intercepted data; intercept, via the interception module using the accessibility API functions, one or more events of user's interaction with a user interface of the user application on the user device; and determine, via an access control module of the security application, an access control policy that specifies and controls whether to allow a user's access to the intercepted data based on the category of intercepted data and types of intercepted events.

An exemplary non-transitory computer readable medium storing computer executable instructions for controlling access to data of a user device using a security application installed as an accessibility service on the user device, includes instructions for: executing, by a processor of the user device, the security application and one or more user applications; intercepting, by an interception module of the security application using a plurality of accessibility application program interface (API) functions, data accessed by a user application being executed on the user device; determining, by a categorization module of the security application, a category of intercepted data; intercepting, by the interception module using the accessibility API functions, one or more events of user's interaction with a user interface of the user application on the user device; and determining, by an access control module of the security application, an access control policy that specifies and controls whether to allow a user's access to the intercepted data based on the category of intercepted data and types of intercepted events.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION

Example aspects of the present invention are described herein in the context of a system, method, and computer program product for controlling access to data of a user device using a security application that provides accessibility services. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
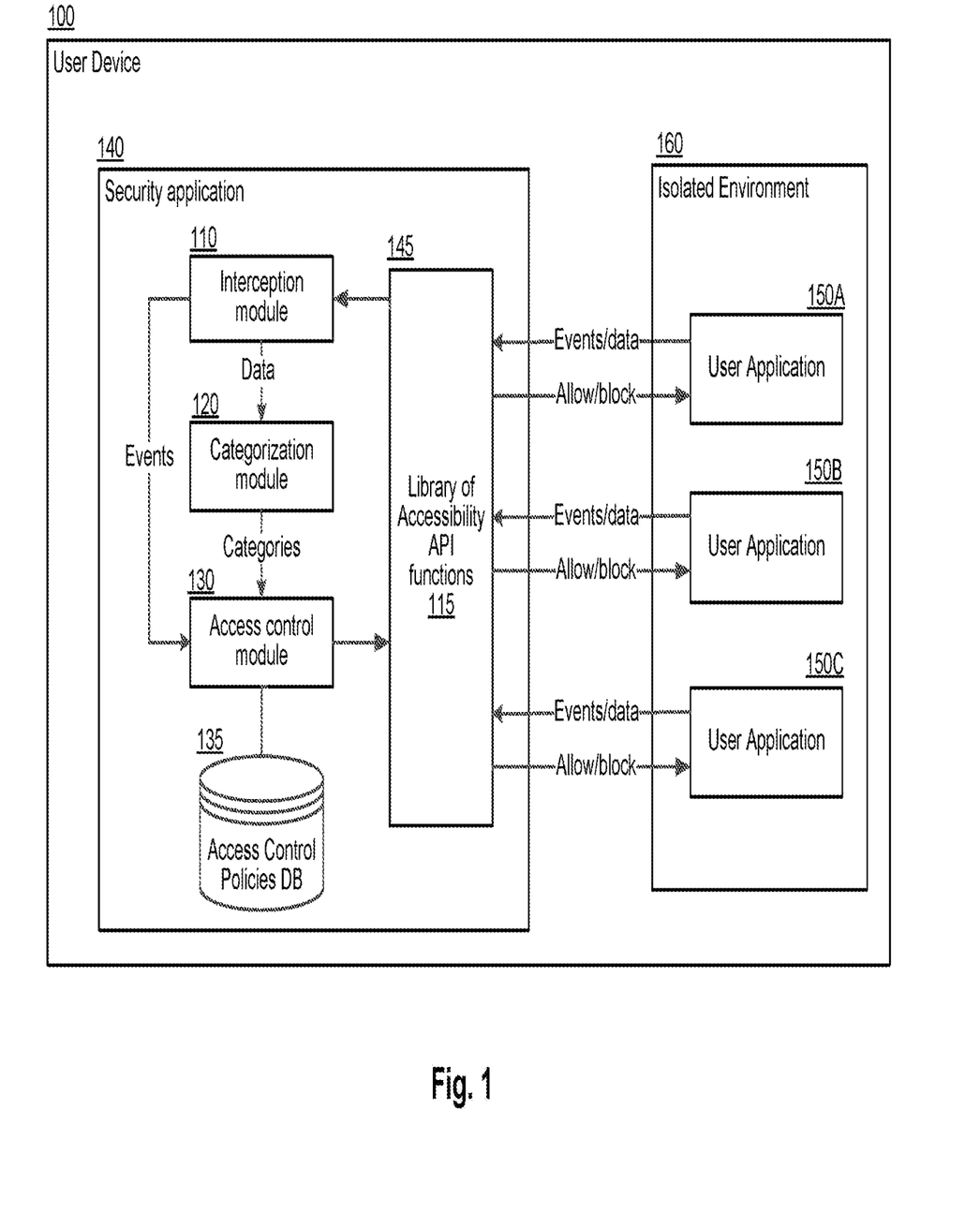
FIG. 1 illustrates a diagram of an exemplary system for controlling access to data on mobile devices using a security application that provides accessibility services.

FIG. 1 shows an exemplary aspect of a system for controlling access to data on user devices using a security application that provides accessibility services. The system may be deployed on a user device 100, such as a desktop computer or a mobile device (e.g., a laptop computer, tablet, smart phone or other portable computing device). The terms "user device" and "mobile device" will be used interchangeably herein. A schematic diagram of an exemplary aspect of a user device 100 will be described below with reference to FIG. 3. The mobile device 100 may execute various user applications 150 (e.g., Internet browser, text processing application, etc.). In order to protect the user from possible malicious applications, user applications 150 may be executed in an isolated environment 160, such as sandbox, on the user device 100. The isolated environment 160 may be created by the operating system of the user device 100 at the time of launching of the user application 150. During their execution in the isolated environment 160, the user applications 150 may try to access various data from files, user input or the Internet, and access various OS services and system resources. The isolated environment 160 may be configured to restrict data access rights of the user applications 150 as well as to place limitations on the access to various OS services and system resources.

In one exemplary aspect, the user device 100 may also have a security application 140 (such as an antivirus application) installed thereon, which is configured to implement aspects of the system for controlling access to data of user applications 150 using API for users with disabilities ("Accessibility API"). In one exemplary aspect, the security application 140 may be registered on the mobile device 100 as a system service for users with disabilities. For example, a user may be prompted to install the security application 140 as a service for users with disabilities (also known as Accessibility Service). For this, for example in the Android OS versions 5.x and earlier versions, it is possible to open a tab for "Accessibility" system settings, and install the security application 140 as one of the providers of this service. Once registered as a system service for users with disabilities, the security application 140 receives from the OS access to events and data of user applications 150 being executed in the isolated environment.

After installing (or registering) the security application 140 as a system service for users with disabilities, the user may specify using a user interface of the security application 140 the parameters for this service, including but not limited to: the names of the user applications 150 that have to be monitored by the security application 140; types of events arising during the execution of user applications 150 that have to be monitored by the security application 140; the names of the user applications 150 from which it is necessary to receive notifications upon occurrence of the events; access rights of monitored user applications; and other parameters.

In one exemplary aspect, the security application 140 includes an interception module 110, a categorization module 120, an access control module 130, and a library 145 of accessibility APIs functions 115 for users with disabilities ("accessibility API functions"). In one exemplary aspect, the interception module 110 is configured to intercept data accessed (e.g., received) by user applications 150 executed in the isolated environment 160 on the user device to 100 using accessibility API functions 115. The intercepting may be done using API functions of services for users with disabilities 115, such as a voice narration function (e.g., the text being narrated is intercepted in clear form and at full volume by a dedicated accessibility API function 115 of the security application 140); screen magnifier function (e.g., an image magnified on the screen of the user device 100 is intercepted by a dedicated accessibility API function 115 of the security application 140); data output function to an external device supporting a Braille display (e.g., data sent to Braille display is intercepted by a dedicated accessibility API function 115 of the security application 140); and other accessibility API functions 115.

In another exemplary aspect, the interception module 110 may be further configured to use the accessibility API functions 115 of the security application 140 to intercept various types of events of execution of the user applications 150, such as: pressing/holding down of an element of the graphic user interface (GUI) of the user application 150; shifting of focus to another element of the GUI of the user application 150; selecting of an object in an element of the GUI containing a list of objects (such as changing a selected element in ListBox or RadioButtonGroup); changing of text in an element of the GUI of the user application 150; displaying a window (main or dialog window) of the user application 150 on the screen of the user device 100.

In one exemplary aspect, the interception module 110 transfers the intercepted data to the categorization module 120, and information about the intercepted events to the access control module 130. In one exemplary aspect, the information about the intercepted events contains the type of the event. In another exemplary aspect, the information about the intercepted events contains a description of the element of the GUI of the user application 150 with which the event occurred. In another exemplary aspect, the information about the intercepted events contains a description of the window of the application 150 with which the event occurred. It should be noted that in different exemplary aspects the information can be supplemented by other knowledge of the events available to the interception module 110.

In one exemplary aspect, the categorization module 120 determines the categories of the intercepted data. In one exemplary aspect, the categorization module 120 determines the type of intercepted data, such as text, a uniform resource locator (URL), an image, an archive file, and an executable application. In another exemplary aspect, the categorization module 120 may also perform an anti-virus and/or anti-phishing analysis of the intercepted data. The anti-virus analysis may include a signature analysis, a heuristic analysis or a behavioral analysis of the intercepted data for presence of malware. The anti-phishing analysis may include analysis of active control elements (such as elements of the graphic user interface for entry of information) using known anti-phishing techniques. The antivirus and/or anti-phishing analysis of the intercepted data may be performed locally by the security application 140 or with the assistance of remote network server or cloud service. As a result of this analysis, the categorization module 120 categorizes the intercepted data into different categories.

In one exemplary aspect, the categorization module 120 may categorize the intercepted data as safe or unsafe. Safe data may include data that does not cause any apparent harm to the user or user device 100, such as clean text files, clean image files, clean executable files, URL of safe websites, and the like. Unsafe data may include computer viruses, phishing scripts and other types of malicious data and code that may inflict harm to the user or user device 100, such as disruption of the operation of the user device 100, leakage or loss of confidential data, financial losses, and other harmful effects. For example, if data has been considered harmful, as a result of scanning by an anti-virus or anti-phishing module, the categories of "harmful URL" or "phishing URL" may be added by the categorization module 120, and data in these categories will be considered to be unsafe. In yet another exemplary aspect, the categorization module 120 may categorize the intercepted data as undesirable, reflecting the presence of information in the data the content of which is not per se harmful to the user or user device 100, but may be considered undesirable or unsuitable for certain users, such as: adult content with age restrictions, drugs, alcohol, tobacco, violence, profanity, weapons, and other types of content categorized as undesirable by the user or the antivirus software.

The categorization module 120 then sends categorization information about intercepted data to the access control module 130. In one exemplary aspect, the transmitted categorization information may include category of the intercepted data (e.g., safe, unsafe, undesirable). In another exemplary aspect, the transmitted categorization information may also identify the type of intercepted data (e.g., text file, image file, executable file, URL, etc.). In yet another exemplary aspect, if the intercepted data is categorized as both unsafe and undesirable at the same time, only information about unsafe category of data may be sent to the access control module 130 as this category is more restrictive and harmful to the user.

In one exemplary aspect, the access control module 130 determines access control policies for permitting or blocking the access of the user application to the data based of the data categories determined by the categorization module 120, and the events intercepted by the interception module 110. Then, based on the determined access control policy, the access control module 130 permits or blocks access of user applications 150 to the requested data using the APIs for users with disabilities.

The access control policies may be stored in an access control policies database 135 provided by the security application 140. In one exemplary aspect, the database 135 can completely reside on the user device 100. In another exemplary aspect, the database 135 can reside at least in part on a remote server hosted by an antivirus company.

In one exemplary aspect, an access control policy may allow access to data of a particular category (e.g., safe category). In another exemplary aspect, an access control policy may prohibit access to data of another particular category (e.g., harmful category). In yet another exemplary aspect, an access control policy may allow or prohibit access to data of a particular category based on type of the data (e.g., allow undesirable text data, but block undesirable images). Other variations of access control policies may be used in other aspects.

The access control module 130 permits or blocks access of the user application 150 to the data in accordance with the determined access control policy and information about the events occurring, obtained from the interception module 110. In one exemplary aspect, the blocking of access may be done using accessibility API functions 115.

In one example of blocking, the access control module 130 using an accessibility API function 115 changes text being entered by the user (this function is supported on the Android OS, starting with version 5.0). The event occurs when the user enters text into a graphic user interface (GUI) element of the user application 150, after which the access control module 130 replaces this text with star symbols ("***"). In this manner, the user application 115 does not see the actual text entered by the user. This helps to hide user's login information (e.g., user name or password) or sensitive personal information (e.g., social security number or credit card details) from phishing scripts running in the user application 115.

In another example of blocking, the access control module 130 using an accessibility API function 115 fills the element of the GUI of user application 150 when the focus is shifted to it (event occurring) with a specific text (this function is supported on the Android OS, starting with version 5.0) or clears the element of the GUI of the user application 150 of the text entered. For example, if the user enters text into a GUI element, which has been found to be unsafe (e.g., phishing element), the text so entered may be replaced by the security application 140 with another text (which, for example, does not have references to user data).

In yet another example of blocking, the access control module 130 using an accessibility API function 115 changes the active element of the GUI of the user application 150 by shifting the focus to another element. For example, when the user attempts to enter text or press a button, an accessibility API function 115 moves the curser to another GUI element, thereby effectively blocking the element with which the user is trying to interact.

In yet another example of blocking, the access control module 130 using an accessibility API function 115 may close a dialog window of the user application 150 with which the user is trying to interact, thereby effectively blocking that element from receiving data from the user.

In yet another example of blocking, the access control module 130 using an accessibility API function 115 performs a pressing on a device button (such as the Home or Back button), thereby effectively preventing the user to enter data on an unsafe website.

In yet another example of blocking, the access control module 130 using an accessibility API function 115 may display a blocking "WARNING" window over undesirable content, which does not allow the user to see the undesirable content (such as obscene language or image).

In yet another example of blocking, when the event of opening a link occurs which has been found to be a phishing link, the access control module 130 using an accessibility API function 115 may send a request to user application (e.g., Web browser) to open a page of the security application 140 (blocking page) instead of the one which the user is trying to open.

In one exemplary aspect, the security application 140 may log the information (data) being entered and displayed by the user application 150. For example, based on the results of the intercepted events, the security application 140 may inform the parent what the child is writing about (in applications for instant messaging, e-mail, social networks, Internet, etc.).

In another exemplary aspect, the security application 140 may track how many times the user has broken a certain access control rule or group of access control rules. The rules can be either security policies of the user device 100 or scripts of user actions (for example, following a link in a web browser). The number of detected violations may be provided to another user for analysis and taking of appropriate disciplinary actions (for example, parents can receive information on the number of violations of the rules by a child, or security officers in a company on the violations of the security rules by the employees).

In yet another exemplary aspect, the security application 140 may protect the user's data from leakage. Thus, for example, attempts by a user to send confidential or personal data may be blocked by the security application 140 (if a child or a company employee tries to send such data), or in event of such data being sent to the user a warning may be displayed. For example, in the event that the user application 150 is found to be safe, but an event occurs when the application 150 accesses the personal files of the user, the user is shown a warning, and the send is blocked (for example, by replacing the active element of the application 150).

In yet another exemplary aspect, the security application 140 may ensure the anonymity of the user in a network. For example, when registered with a resource (e.g., website) the user enters his login name and password, the security application 140 saves this data and uses depersonalized data when working with the resource (e.g., Kaspersky User Id).

In yet another exemplary aspect, the security application 140 may keep track of the data being entered by the user in a user application 150 in order to verify entered data (for example, to verify the strength of the password used by the user).

Figure 2:
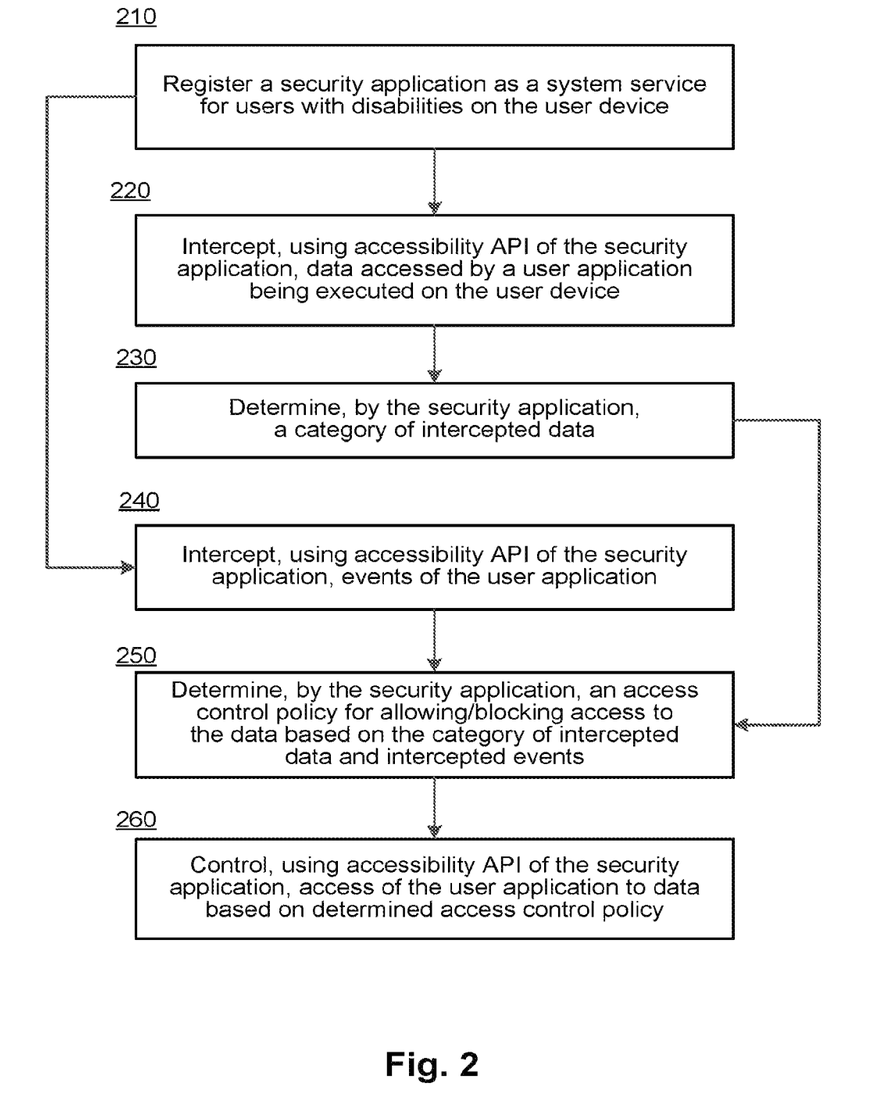
FIG. 2 illustrates a flow diagram of an exemplary method for controlling access to data on mobile devices a security application that provides accessibility services.

FIG. 2 shows an exemplary aspect of a method for controlling access to data on user devices, such as mobile devices, using a security application that provides accessibility services.

In step 210, the security application 140, which includes at least an interception module 110, a categorization module 120 and an access control module 130, is registered as a system service for users with disabilities of the operating system on a user device 100.

In step 220, the interception module 110 using accessibility API functions for users with disabilities 115 intercepts data received by the user application 150, which is being executed in an isolated environment, and sends the intercepted data to the categorization module 120.

In step 230, the categorization module 120 determines the category of the intercepted data and sends the determined category information to the access control module 130. In the process of determining the category, the intercepted data may subjected to an antivirus or anti-phishing analysis. In one exemplary aspect, the data may be categorized as safe, unsafe and/or undesirable. In one exemplary aspect, the categorization module 120 also determines the type of intercepted data, such as text, URL, image, archive file, or executable application.

In step 240, the interception module 110 using the accessibility API functions 115 for users with disabilities intercepts events occurring during the execution of the application 150, and sends the information about the intercepted events to the access control module 130.

In step 250, the access control module 130 determines access control policy for permitting/blocking access to the data on the basis of the determined category of intercepted data and information about the intercepted events of the user application 150.

In step 260, the access control module 130 controls access of the user application 150 to the intercepted data based on the determined access control policy. In one exemplary aspect, the access control module 130 may use accessibility API 115 of the security application 140 to allow or block access of the user application 150 to the intercepted data. For example, blocking of the access may include, but not limited to: changing the active element of the graphic user interface; clearing a selection of a text fragment in an element of the graphic user interface; pressing an element of the graphic user interface; closing a dialog window of the application; change the text in an element of the graphic user interface; press a device button.

Figure 3:
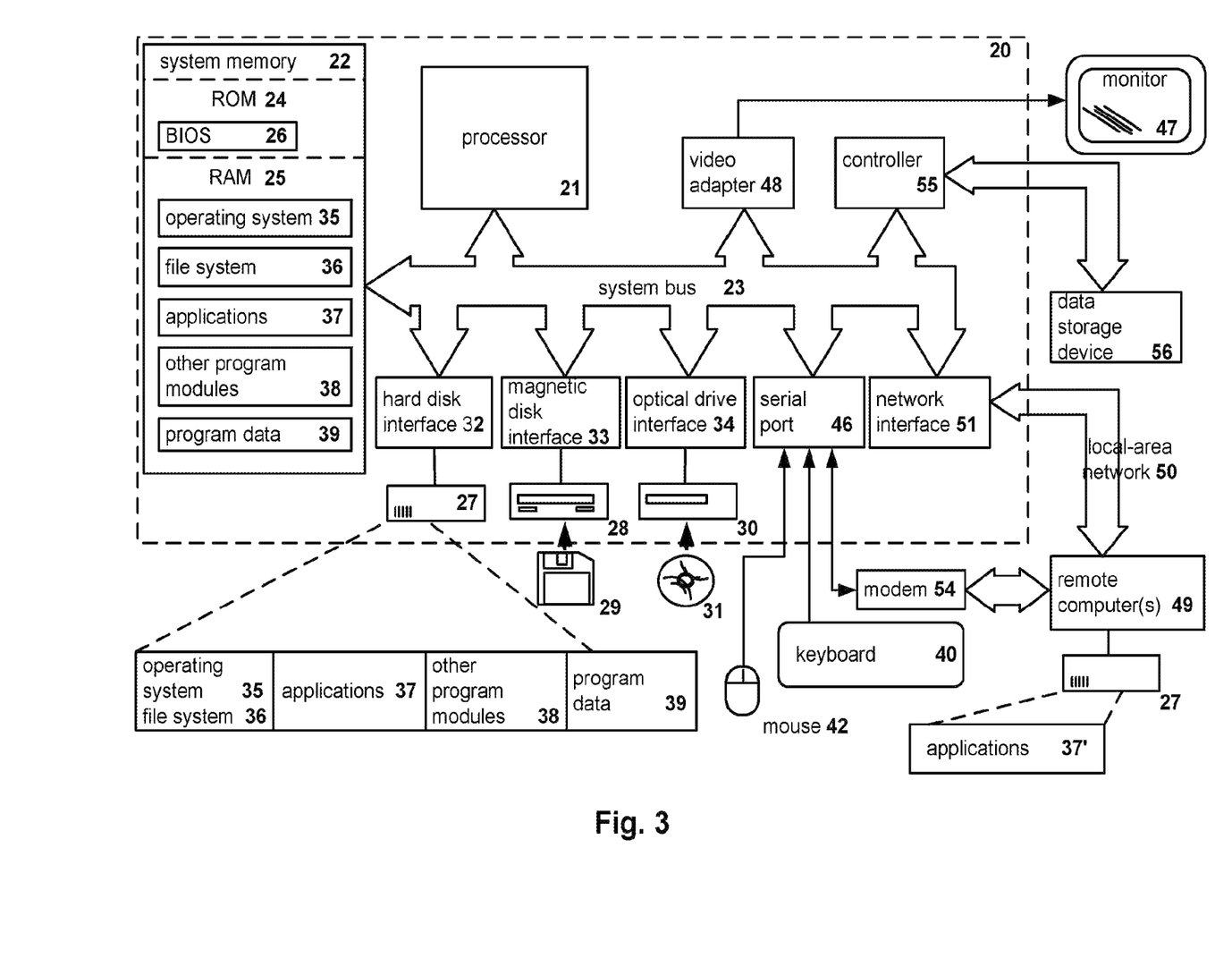
FIG. 3 illustrates an example of a general-purpose computer system by means of which the disclosed aspects of systems and method can be implemented.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are effectiveness-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access to data of a user device using a security application installed as an accessibility service on the user device, the method comprising:
   executing, by a processor of the user device, the security application and one or more user applications;
   intercepting, by an interception module of the security application using a plurality of accessibility application program interface (API) functions, data accessed by a user application being executed on the user device;
   determining, by a categorization module of the security application, a category of intercepted data;
   intercepting, by the interception module using the accessibility API functions, one or more events of user's interaction with a user interface of the user application on the user device; and
   determining, by an access control module of the security application, an access control policy that specifies and controls whether to allow a user's access to the intercepted data based on the category of intercepted data and types of intercepted events.

2. The method of claim 1, further comprising:
   obtaining information relating to at least: user applications to be monitored by the security application, types of events during an execution of the user applications to be monitored by the security application, and access rights of the user applications.

3. The method of claim 1, wherein executing the security application and the one or more user applications comprises:
   executing the security application and the one or more user applications in an isolated environment that is created by an operating system of the user device at the time of launching each of the one or more user applications.

4. The method of claim 1, wherein the plurality of accessibility API functions comprise at least one of: a voice narration function, a screen magnifier function, a data output function to an external device supporting a Braille display.

5. The method of claim 1, wherein determining, by the categorization module of the security application, the category of intercepted data comprises performing at least one of an anti-virus or anti-phishing analysis of the intercepted data, wherein the anti-virus analysis includes at least one of a signature analysis, a heuristic analysis, or a behavior analysis of the intercepted data for presence of malware, and the anti-phishing analysis includes an analysis of active control elements of the user interface of the user application.

6. The method of claim 1, further comprising blocking, by the access control module of the security application, the user's access to at least a portion of the intercepted data in response to detecting that the category of intercepted data indicates a harmful category and the types of intercepted events indicate a presence of undesirable information.

7. The method of claim 1, further comprising:
   maintaining a log of data entered and displayed by the user application on the user interface of the user device for parental control purposes.

8. A system for controlling access to data of a user device using a security application installed as an accessibility service on the user device, the system comprising:
   a hardware processor of the user device configured to:
   execute the security application and one or more user applications;
   intercept, via an interception module of the security application using a plurality of accessibility application program interface (API) functions, data accessed by a user application being executed on the user device;
   determine, via a categorization module of the security application, a category of intercepted data;
   intercept, via the interception module using the accessibility API functions, one or more events of user's interaction with a user interface of the user application on the user device; and
   determine, via an access control module of the security application, an access control policy that specifies and controls whether to allow a user's access to the intercepted data based on the category of intercepted data and types of intercepted events.

9. The system of claim 8, wherein the processor is further configured to obtain information relating to at least: user applications to be monitored by the security application, types of events during an execution of the user applications to be monitored by the security application, and access rights of the user applications.

10. The system of claim 8, wherein, to execute the security application and the one or more user applications, the processor is further configured to execute the security application and the one or more user applications in an isolated environment that is created by an operating system of the user device at the time of launching each of the one or more user applications.

11. The system of claim 8, wherein the plurality of accessibility API functions comprise at least one of: a voice narration function, a screen magnifier function, a data output function to an external device supporting a Braille display.

12. The system of claim 8, wherein, to determine, via the categorization module of the security application, the category of intercepted data, the processor is further configured to perform at least one of an anti-virus or anti-phishing analysis of the intercepted data, wherein the anti-virus analysis includes at least one of a signature analysis, a heuristic analysis, or a behavior analysis of the intercepted data for presence of malware, and the anti-phishing analysis includes an analysis of active control elements of the user interface of the user application.

13. The system of claim 8, wherein the processor is further configured to block, via the access control module of the security application, the user's access to at least a portion of the intercepted data in response to detecting that the category of intercepted data indicates a harmful category and the types of intercepted events indicate a presence of undesirable information.

14. The system of claim 8, wherein the processor is further configured to maintain a log of data entered and displayed by the user application on the user interface of the user device for parental control purposes.

15. A non-transitory computer readable medium storing computer executable instructions for controlling access to data of a user device using a security application installed as an accessibility service on the user device, including instructions for:
  executing, by a processor of the user device, the security application and one or more user applications;
  intercepting, by an interception module of the security application using a plurality of accessibility application program interface (API) functions, data accessed by a user application being executed on the user device;
  determining, by a categorization module of the security application, a category of intercepted data;
  intercepting, by the interception module using the accessibility API functions, one or more events of user's interaction with a user interface of the user application on the user device; and
  determining, by an access control module of the security application, an access control policy that specifies and controls whether to allow a user's access to the intercepted data based on the category of intercepted data and types of intercepted events.

16. The non-transitory computer readable medium of claim 15, further comprising instructions for obtaining information relating to at least: user applications to be monitored by the security application, types of events during an execution of the user applications to be monitored by the security application, and access rights of the user applications.

17. The non-transitory computer readable medium of claim 15, wherein the instructions for executing the security application and the one or more user applications comprise instructions for executing the security application and the one or more user applications in an isolated environment that is created by an operating system of the user device at the time of launching each of the one or more user applications.

18. The non-transitory computer readable medium of claim 15, wherein the plurality of accessibility API functions comprise at least one of: a voice narration function, a screen magnifier function, a data output function to an external device supporting a Braille display.

19. The non-transitory computer readable medium of claim 15, further comprising instructions for blocking, by the access control module of the security application, the user's access to at least a portion of the intercepted data in response to detecting that the category of intercepted data indicates a harmful category and the types of intercepted events indicate a presence of undesirable information.

20. The non-transitory computer readable medium of claim 15, further comprising instructions for maintaining a log of data entered and displayed by the user application on the user interface of the user device for parental control purposes.

* * * * *